(12) United States Patent  
Huang et al.

(10) Patent No.: US 8,670,555 B2  
(45) Date of Patent: Mar. 11, 2014

(54) COMMUNICATION APPARATUS FOR RAPIDLY ADJUSTING ANALOG ECHO CANCELLATION CIRCUIT AND RELATED ECHO CANCELLATION METHOD

(75) Inventors: Liang-Wei Huang, Hsinchu (TW); Shieh-Hsing Kuo, Hsinchu (TW); Jui-Yi Liu, Taipei (TW); Tzu-Han Hsu, Kaohsiung (TW)

(73) Assignee: Realtek Semiconductor Corp., Hsinchu (TW)

( * ) Notice: Subject to any disclaimer, the term of this patent is extended or adjusted under 35 U.S.C. 154(b) by 162 days.

(21) Appl. No.: 13/339,255

(22) Filed: Dec. 28, 2011

(65) Prior Publication Data

US 2012/0170735 A1 Jul. 5, 2012

(30) Foreign Application Priority Data

Dec. 29, 2010 (TW) ................................. 99146589 A

(51) Int. Cl.  
*H04M 9/08* (2006.01)
(52) U.S. Cl.  
USPC ...................................................... 379/406.1
(58) Field of Classification Search  
USPC ............... 379/406.01–406.16, 406.1  
See application file for complete search history.

(56) References Cited

U.S. PATENT DOCUMENTS

| | | | |
|---|---|---|---|
| 7,102,381 B2 * | 9/2006 | Chen et al. ...................... 326/30 |
| 7,139,342 B1 * | 11/2006 | Phanse .......................... 375/350 |
| 7,304,961 B2 | 12/2007 | Huang et al. |
| 7,333,603 B1 | 2/2008 | Sallaway et al. |
| 7,643,563 B2 | 1/2010 | Huang et al. |
| 2005/0169163 A1 | 8/2005 | Huang et al. |
| 2010/0208577 A1 | 8/2010 | Huang et al. |

* cited by examiner

*Primary Examiner* — Simon Sing  
(74) *Attorney, Agent, or Firm* — Birch, Stewart, Kolasch & Birch, LLP

(57) ABSTRACT

A communication apparatus is disclosed including: an analog-front-end circuit for receiving and processing an analog input signal; an analog-to-digital converter (ADC) coupled with the analog-front-end circuit for converting processed signal from the analog-front-end circuit into a digital input signal; and a control unit coupled with the ADC for adjusting at least one resistance and/or at least one capacitance in an analog echo cancellation circuit according to the digital input signal before the analog-front-end circuit receives a training sequence that is the first training sequence transmitted from a second communication apparatus after the second communication apparatus begins communicating with the communication apparatus.

18 Claims, 3 Drawing Sheets

COMMUNICATION APPARATUS FOR RAPIDLY ADJUSTING ANALOG ECHO CANCELLATION CIRCUIT AND RELATED ECHO CANCELLATION METHOD

CROSS-REFERENCE TO RELATED APPLICATIONS

This application claims the benefit of priority to Taiwanese Patent Application No. 099146589, filed on Dec. 29, 2010; the entirety of which is incorporated herein by reference for all purposes.

BACKGROUND

The present disclosure generally relates to communication devices, and more particularly, to a communication apparatus for rapidly adjusting parameters of an analog echo cancellation circuit and related echo cancellation method.

An Ethernet communication device utilizes four pairs of twist lines to conduct full duplex transmission, and thus a single transmission port includes four channels. The signal received by each channel, i.e., a pair of twist lines, is often affected by the interference caused by near-end echo and far-end echo.

In order to obtain better signal receiving quality, the communication device has to cancel the echo interference. The echo cancellation method in related art utilizes analog circuit or digital circuit to be echo cancellation circuit and configures appropriate parameters for the echo cancellation circuit to reduce the above echo interference. If the communication device can not rapidly complete the setting of parameters of the echo cancellation circuit, the echo interference may cause problems such as packet loss.

SUMMARY

In view of the foregoing, it can be appreciated that a substantial need exists for methods and apparatuses that can mitigate or reduce the problems in providing multimedia streaming service.

An example embodiment of a communication apparatus is disclosed comprising: a transmitter for transmitting a first training sequence to a second communication apparatus after a calibration order is decided by the communication apparatus and the second communication apparatus according to a master-slave relationship between the communication apparatus and the second communication apparatus; an analog-front-end circuit coupled with the transmitter for receiving and processing an analog input signal during a period, wherein the period starts while the transmitter transmits the first training sequence to the second communication apparatus and the period ends before the analog-front-end circuit receives a second training sequence; an analog-to-digital converter (ADC) coupled with the analog-front-end circuit for converting processed signal from the analog-front-end circuit into a digital input signal; and a control unit coupled with the ADC and the transmitter for adjusting at least one resistance, at least one capacitance, or at least one resistance and at least one capacitance in an analog echo cancellation circuit according to the digital input signal before the analog-front-end circuit receives the second training sequence; wherein the second training sequence is a very first training sequence transmitted from the second communication apparatus after the calibration order is decided.

An echo cancellation method for use in a communication apparatus is disclosed. The method comprises: utilizing a transmitter to transmit a first training sequence to a second communication apparatus after a calibration order is decided by the communication apparatus and the second communication apparatus according to a master-slave relationship between the communication apparatus and the second communication apparatus; receiving and processing an analog input signal at the communication apparatus during a period, wherein the period starts while the transmitter transmits the first training sequence to the second communication apparatus and the period ends before the analog-front-end circuit receives a second training sequence; converting processed signal into a digital input signal; and adjusting at least one resistance, at least one capacitance, or at least one resistance and at least one capacitance in an analog echo cancellation circuit of the communication apparatus before receiving the second training sequence; wherein the second training sequence is a very first training sequence transmitted from the second communication apparatus after the calibration order is decided.

An example embodiment of a communication apparatus is disclosed comprising: a transmitter for transmitting a first training sequence to a second communication apparatus after a calibration order is decided by the communication apparatus and the second communication apparatus according to a master-slave relationship between the communication apparatus and the second communication apparatus; an analog-front-end circuit coupled with the transmitter for receiving and processing an analog input signal during a period, wherein the period starts while the transmitter transmits the first training sequence to the second communication apparatus and the period ends before the analog-front-end circuit receives a second training sequence; an analog-to-digital converter (ADC) coupled with the analog-front-end circuit for converting processed signal from the analog-front-end circuit into a digital input signal; and a control unit coupled with the ADC and the transmitter for adjusting at least one resistance, at least one capacitance, or at least one resistance and at least one capacitance in an analog echo cancellation circuit according to the digital input signal when the transmitter begins the transmission of the first training sequence; wherein the second training sequence is a very first training sequence transmitted from the second communication apparatus after the calibration order is decided.

It is to be understood that both the foregoing general description and the following detailed description are exemplary and explanatory only and are not restrictive of the disclosure, as claimed.

DETAILED DESCRIPTION

Certain terms are used throughout the description and following claims to refer to particular components. As one skilled in the art will appreciate, vendors may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . " Also, the phrase "coupled with" is intended to compass any indirect or direct connection. Accordingly, if this document mentioned that a first device is coupled with a second device, it means that the first device may be directly or indirectly connected to the second device through an electrical connection, wireless communications, optical communications, or other signal connections with/without other intermediate devices or connection means.

Figure 1:
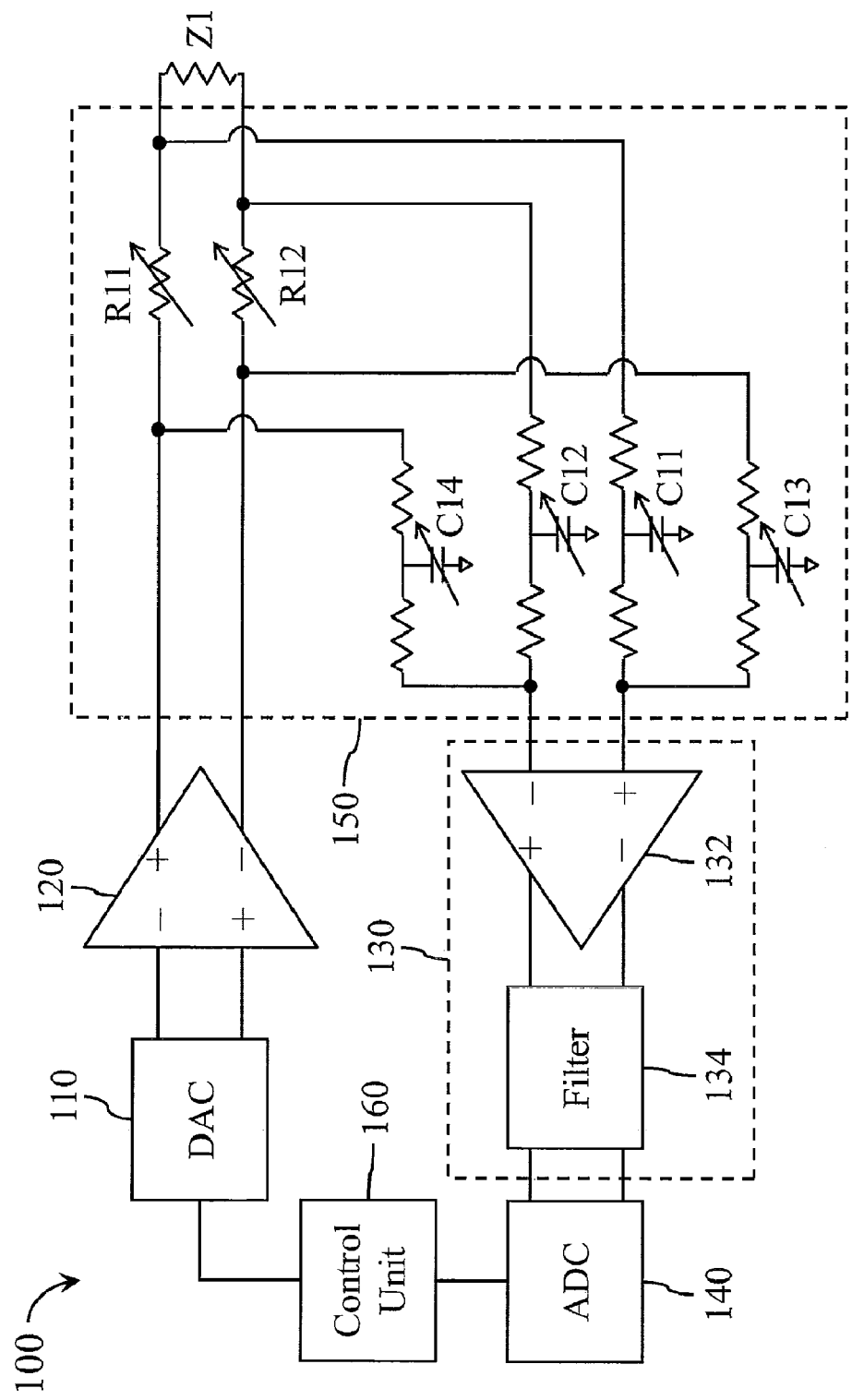
FIG. 1 and FIG. 2 are simplified block diagrams of two interlinked communication devices in accordance with an example embodiment.
Figure 2:
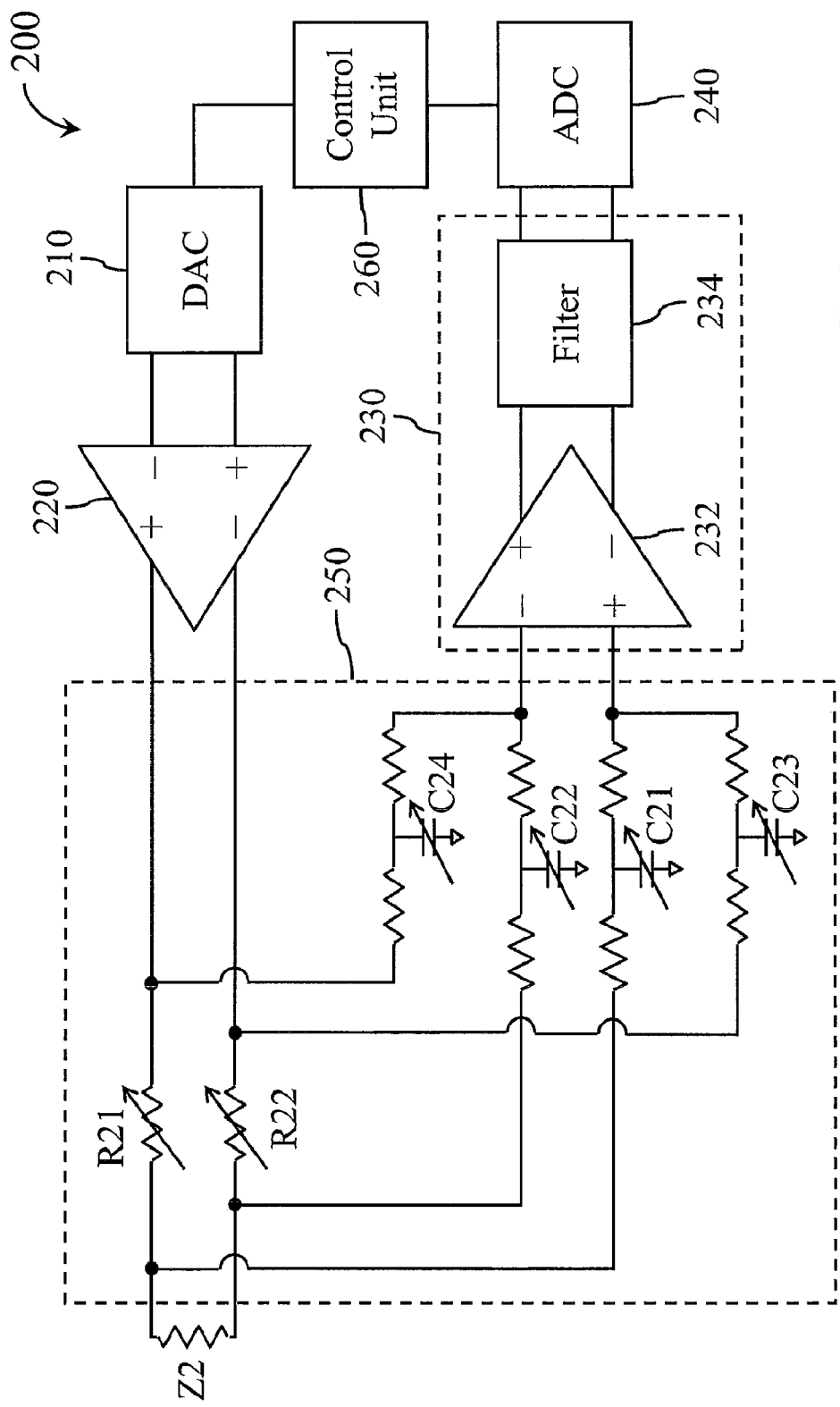

Reference will now be made in detail to embodiments of the disclosure, which are illustrated in the accompanying drawings. FIG. 1 and FIG. 2 are simplified block diagrams of a communication device 100 and an interlinked communication device 200 in accordance with an example embodiment.

As shown in FIG. 1, the communication device 100 comprises a digital-to-analog converter (DAC) 110, a transmitter 120, an analog-front-end (AFE) circuit 130, an analog-to-digital converter (ADC) 140, an analog echo cancellation circuit 150, and a control unit 160. In this embodiment, the AFE circuit 130 comprises an auto gain controller (AGC) 132 and a filter 134. The analog echo cancellation circuit 150 is coupled between the transmitter 120 and the AFE circuit 130, and comprises resistors R11 and R12, and capacitors C11, C12, C13, and C14.

In the embodiment of FIG. 1, the resistor R11 is coupled with a non-inverted input terminal of the transmitter 120 and a non-inverted input terminal of the AGC 132. The resistor R12 is coupled with an inverted input terminal of the transmitter 120 and an inverted input terminal of the AGC 132. The capacitor C11 is coupled with a terminal of the resistor R11 and the non-inverted input terminal of the AGC 132. The capacitor C12 is coupled with a terminal of the resistor R12 and the inverted input terminal of the AGC 132. The capacitor C13 is coupled with the non-inverted input terminal of the transmitter 120 and the non-inverted input terminal of the AGC 132. The capacitor C14 is coupled with the non-inverted input terminal of the transmitter 120 and the inverted input terminal of the AGC 132.

The control unit 160 may adjust the resistance of the resistor R11 and/or R12 of the analog echo cancellation circuit 150 to match an external impendence Z1, thereby reducing the echo components coupling to the AFE circuit 130. In this embodiment, the external impendence Z1 denotes all external impendence coupling to the communication device 100.

As shown in FIG. 2, the communication device 200 comprises a DAC 210, a transmitter 220, an AFE circuit 230, an ADC 240, an analog echo cancellation circuit 250, and a control unit 260. Similarly, the AFE circuit 230 of this embodiment comprises an AGC 232 and a filter 234. The analog echo cancellation circuit 250 is coupled between the transmitter 220 and the AFE circuit 230, and comprises resistors R21 and R22, and capacitors C21, C22, C23, and C24.

In the embodiment of FIG. 2, the resistor R21 is coupled with a non-inverted input terminal of the transmitter 220 and a non-inverted input terminal of the AGC 232. The resistor R22 is coupled with an inverted input terminal of the transmitter 220 and an inverted input terminal of the AGC 232. The capacitor C21 is coupled with a terminal of the resistor R21 and the non-inverted input terminal of the AGC 232. The capacitor C22 is coupled with a terminal of the resistor R22 and the inverted input terminal of the AGC 232. The capacitor C23 is coupled with the non-inverted input terminal of the transmitter 220 and the non-inverted input terminal of the AGC 232. The capacitor C24 is coupled with the non-inverted input terminal of the transmitter 220 and the inverted input terminal of the AGC 232.

Similar to the communication device 100, the control unit 260 of the communication device 200 may adjust the resistance of the resistor R21 and/or R22 of the analog echo cancellation circuit 250 to match an external impendence Z2, thereby reducing the echo components coupling to the AFE circuit 230. In this embodiment, the external impendence Z2 denotes all external impendence coupling to the communication device 200.

In implementations, the control unit 160 and the control unit 260 may be realized with a DSP or other digital and/or analog circuit.

The echo cancellation mechanism of the communication device 100 and the communication device 200 will be described below with reference to FIG. 3.

Figure 3:
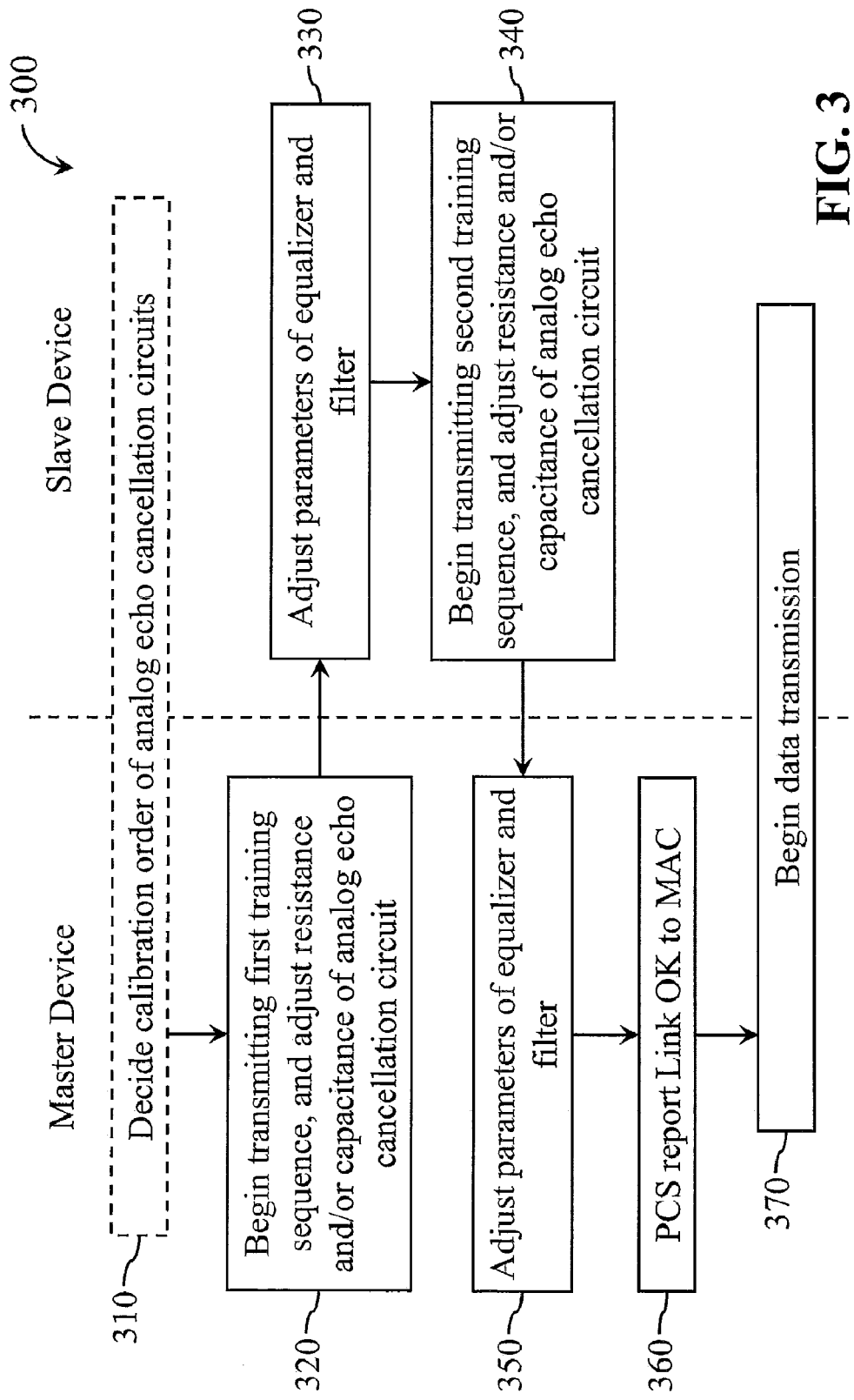
FIG. 3 is a simplified flowchart illustrating an echo cancellation method according to an example embodiment.

FIG. 3 is a simplified flowchart 300 illustrating an echo cancellation method according to an example embodiment. When the communication device 100 and the communication device 200 interlink with each other via a cable or other wireless link, the communication device 100 and the communication device 200 perform operation 310 to decide the calibration order of the analog echo cancellation circuits 150 and 250. In other words, the analog echo cancellation circuits 150 and 250 are calibrated in order, which means they are calibrated separately, not simultaneously.

The communication device 100 and the communication device 200 may decide the calibration order of the analog echo cancellation circuits 150 and 250 with various mechanisms. For example, if the communication device 100 and the communication device 200 are communication devices complying with Gigabit Ethernet standard or 10G Ethernet standard, then the communication device 100 and the communication device 200 may perform the auto-negotiation procedure defined in the communication standard to determine their master-slave relationship. In operations, the communication devices 100 and 200 may also decide their common transmission parameters, such as transmission rate, duplex mode, etc., in the auto-negotiation procedure.

In this embodiment, it is assumed that the negotiation procedure in operation 310 decides that the communication device 100 is the master device and the communication device 200 is the slave device.

In operation 320, the control unit 160 of the communication device 100 utilizes the DAC 110 and the transmitter 120 to begin transmitting a training sequence TS1 to the communication device 200. Additionally, when the transmitter 120 begins transmitting the training sequence TS1 to the communication device 200, the control unit 160 of the communication device 100 begins to adjust the resistance and/or capacitance of the analog echo cancellation circuit 150.

In operation 320, the AFE circuit 130 processes received differential analog input signals and the ADC 140 converts the signals processed by the AFE circuit 130 into a digital input signal D1.

The control unit 160 may adjust the resistance and/or capacitance of the analog echo cancellation circuit 150 in operation 320 based on the digital input signal D1 outputted from the ADC 140. In one embodiment, the control unit 160 may adjust the resistance of the resistors R11 and R12 and/or the capacitance of the capacitor C11~C14 of the analog echo cancellation circuit 150 according to a signal-to-noise ratio (SNR) of the digital input signal D1. A combination of resistance and capacitance settings that could optimize the SNR of the digital input signal D1 is the best parameter setting for the analog echo cancellation circuit 150.

For example, the control unit 160 may first set the capacitance of the capacitors C11~C14 to be constant, and then changes the resistance of the resistor R11 and/or the resistor R12 to figure out the best resistance settings of the resistors R11 and R12 that could optimize the SNR of the digital input signal D1. When the best resistance settings of the resistors R11 and R12 are determined, the control unit 160 may keep the resistance of the resistors R11 and R12 to be constant and then changes the capacitance of at least one of the capacitors C11~C14 to find out that best capacitance settings of the capacitors C11~C14 that could optimize the SNR of the digital input signal D1.

Alternatively, the control unit 160 may first set the resistance of the resistors R11 and R12 to be constant, and then changes the capacitance of at least one of the capacitors C11~C14 to figure out the best capacitance settings of the capacitors C11~C14 that could optimize the SNR of the digital input signal D1. When the best capacitance settings of the capacitors C11~C14 are determined, the control unit 160 may keep the capacitance of the capacitors C11~C14 to be constant and then changes the resistance of the resistor R11 and/or the resistor R12 to find out that best resistance settings of the resistors R11 and R12 that could optimize the SNR of the digital input signal D1.

In implementations, the control unit 160 may calculate the echo components in the digital input signal D1 using other approaches and accordingly adjust the resistance and/or capacitance of the analog echo cancellation circuit 150.

In the previous embodiments, there are four capacitors C11~C14 arranged in the analog echo cancellation circuit 150. This merely an example embodiment, not a restriction of the implementations. In other embodiments, for example, there may be only two capacitors be arranged in the analog echo cancellation circuit 150, such as the capacitors C11 and C12, or the capacitors C13 and C14.

In operation 330, the control unit 260 of the communication device 200 adjusts the parameters of an equalizer (not shown) in the control unit 260 and the filter 234 of the AFE circuit 230 according to the training sequence TS1 transmitted from the communication device 100 so as to converge the parameters of these components to idea settings.

When the control unit 260 completes the parameter adjustments in operation 330, it proceeds to operation 340.

In operation 340, the control unit 260 of the communication device 200 utilizes the DAC 210 and the transmitter 220 to begin transmitting a training sequence TS2 to the communication device 100. Additionally, when the transmitter 220 begins transmitting the training sequence TS2 to the communication device 100, the control unit 260 of the communication device 200 begins to adjust the resistance and/or capacitance of the analog echo cancellation circuit 250.

In operation 340, the AFE circuit 230 of the communication device 200 processes received differential analog input signals and the ADC 240 converts the signals processed by the AFE circuit 230 into a digital input signal D2.

The control unit 260 may adjust the resistance and/or capacitance of the analog echo cancellation circuit 250 in operation 340 based on the digital input signal D2 outputted from the ADC 240. In one embodiment, the control unit 260 may adjust the resistance of the resistors R11 and R12 and/or the capacitance of the capacitor C11~C14 of the analog echo cancellation circuit 250 according to the SNR of the digital input signal D2. A combination of resistance and capacitance settings that could optimize the SNR of the digital input signal D2 is the best parameter setting for the analog echo cancellation circuit 250.

For example, the control unit 260 may first set the capacitance of the capacitors C21~C24 to be constant, and then changes the resistance of the resistor R21 and/or the resistor R22 to figure out the best resistance settings of the resistors R21 and R22 that could optimize the SNR of the digital input signal D2. When the best resistance settings of the resistors R21 and R22 are determined, the control unit 260 may keep the resistance of the resistors R21 and R22 to be constant and then changes the capacitance of at least one of the capacitors C21~C24 to find out that best capacitance settings of the capacitors C21~C24 that could optimize the SNR of the digital input signal D2.

Alternatively, the control unit 260 may first set the resistance of the resistors R21 and R22 to be constant, and then changes the capacitance of at least one of the capacitors C21~C24 to figure out the best capacitance settings of the capacitors C21~C24 that could optimize the SNR of the digital input signal D2. When the best capacitance settings of the capacitors C21~C24 are determined, the control unit 260 may keep the capacitance of the capacitors C21~C24 to be constant and then changes the resistance of the resistor R21 and/or the resistor R22 to find out that best resistance settings of the resistors R21 and R22 that could optimize the SNR of the digital input signal D2.

In implementations, the control unit 260 may calculate the echo components in the digital input signal D2 using other approaches and accordingly adjust the resistance and/or capacitance of the analog echo cancellation circuit 250.

In addition, the control unit 260 may stop updating or lower the frequency of updating an equalizer (not shown) of the control unit 260 while adjusting the resistance and/or capacitance of the analog echo cancellation circuit 250 to avoid the accuracy of echo calculation from being adversely affected.

In the previous embodiments, there are four capacitors C21~C24 arranged in the analog echo cancellation circuit 250. This merely an example embodiment, not a restriction of the implementations. In other embodiments, for example, there may be only two capacitors be arranged in the analog echo cancellation circuit 250, such as the capacitors C21 and C22, or the capacitors C23 and C24.

In operation 350, the control unit 160 of the communication device 100 adjusts the parameters of the equalizer (not shown) in the control unit 160 and the filter 134 of the AFE circuit 130 according to the training sequence TS2 transmitted from the communication device 200 so as to converge the parameters of these components to idea settings.

When the control unit 160 of the communication device 100 completes the operation 350, it proceeds to operation 360.

In operation 360, a PCS circuit (not shown) of the communication device 100 reports the status of Link OK to a MAC circuit (not shown) of the communication device 100. In implementations, the control unit 160 of the communication device 100 may be part of the PCS circuit and/or part of the MAC circuit.

Afterward, the communication device 100 and the communication device 200 are allowed to proceed to operation 370 to begin data transmission.

As described previously, when the transmitter 120 of the communication device 100 begins transmitting the training sequence TS1 to the communication device 200 in operation 320, the control unit 160 of the communication device 100 also begins to adjust the resistance and/or capacitance of the analog echo cancellation circuit 150. Accordingly, operations 320 and 330 may be performed simultaneously.

In addition, before the control unit 260 completes the parameter adjustments of operation 330, only the communication device 100 that acts as the master device transmits the training sequence to the communication device 200, the communication device 200 that acts as the slave device does not transmit the training sequence to the communication device 100. Thus, in the earlier stage of operation 320, the AFE circuit 130 of the communication device 100 is affected by only the echo caused by the transmitter 120 in the same channel and near end cross talk (NEXT) caused by the transmitters in other channels. In this situation, the control unit 160 is able to obtain more accurate echo estimation based on the digital input signal D1.

Moreover, since it only requires a very short period for the control unit 160 to calculate the SNR of the digital input signal D1, the control unit 160 is able to complete the parameter settings for the resistance and/or capacitance of the analog echo cancellation circuit 150 in a very short period when the operation 320 begins. As a result, the time at which the control unit 160 of the communication device 100 completes the parameter settings for the resistance and/or capacitance of the analog echo cancellation circuit 150 would be earlier than the time at which the control unit 260 of the communication device 200 completes the parameter settings of operation 330, and also earlier than the beginning of operation 340.

In other words, the control unit 160 of the communication device 100 is able to complete the parameter settings for the resistance and/or capacitance of the analog echo cancellation circuit 150 before the communication device 100 receives the training sequence TS2 that is the first training sequence transmitted from the communication device 200 after the communication device 200 begins communicating with the communication device 100.

Similar to the operations of the communication device 100, when the transmitter 220 of the communication device 200 begins transmitting the training sequence TS2 to the communication device 100 in operation 340, the control unit 260 of the communication device 200 also begins to adjust the resistance and/or capacitance of the analog echo cancellation circuit 250. Accordingly, operations 340 and 350 may be performed simultaneously.

Since it only requires a very short period for the control unit 260 to calculate the SNR of the digital input signal D2, the control unit 260 is able to complete the parameter settings for the resistance and/or capacitance of the analog echo cancellation circuit 250 in a very short period when the operation 340 begins. As a result, the time at which the control unit 260 of the communication device 200 completes the parameter settings for the resistance and/or capacitance of the analog echo cancellation circuit 250 would be earlier than the time at which the control unit 160 of the communication device 100 completes the parameter settings of operation 350, and also earlier than the beginning of operations 360 and 370. Accordingly, the control unit 260 of the communication device 200 is able to complete the parameter settings for the resistance and/or capacitance of the analog echo cancellation circuit 250 before the communication device 100 and the communication device 200 complete the interlink operation.

In the foregoing embodiments, the communication device 100 and the communication device 200 are assumed as communication devices complying with Gigabit Ethernet standard or 10G Ethernet standard, but this is merely an example, not a restriction of the practical applications.

In applications, the communication device 100 and the communication device 200 may be communication devices complying with HDMI Ethernet Channel (HEC) series standard. Although the auto-negotiation procedure defined in the Ethernet standard is not introduced into the HEC standard, but the communication device 100 and the communication device 200 of this embodiment may utilize other mechanism to decide the calibration order of the analog echo cancellation circuits 150 and 250 instead of using the auto-negotiation procedure. For example, the communication device 100 and the communication device 200 may utilize the communication protocol defined by other hardware manufacturers to decide their master-slave relationship, and then decide the calibration order of the analog echo cancellation circuits 150 and 250 based on their master-slave relationship.

When two communication devices interlink with each other, the echo cancellation method disclosed previously dynamically adjusts the echo cancellation parameters of the analog echo cancellation circuits of the communication devices. Therefore, the settings of the resistance and/or capacitance of the analog echo cancellation circuit can be adaptively adjusted in different linking environments or cable length, thereby improving the echo cancellation effect.

In addition, the analog echo cancellation circuits 150 and 250 are calibrated in order, not simultaneously. Accordingly, the calibration operations of the analog echo cancellation circuits 150 and 250 would not interact with each other. This arrangement makes the calibration result more precisely and increases the calibration speed.

On the other hand, since the time at which the control unit 160 of the communication device 100 completes the parameter settings for the resistance and/or capacitance of the analog echo cancellation circuit 150 is earlier than the beginning of operation 340, the control unit 160 would complete the parameter settings for the resistance and/or capacitance of the analog echo cancellation circuit 150 before the communication device 100 and the communication device 200 complete the interlink operation. Since the time at which the control unit 260 of the communication device 200 completes the parameter settings for the resistance and/or capacitance of the analog echo cancellation circuit 250 is earlier than the beginning of operation 360, the control unit 260 would also complete the parameter settings for the resistance and/or capacitance of the analog echo cancellation circuit 250 before the communication devices 100 and 200 complete the interlink operation. As a result, the problem of packet loss can be effectively avoided.

Other embodiments of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

What is claimed is:
1. A communication apparatus comprising:
a transmitter, for transmitting a first training sequence to a second communication apparatus after a calibration order is decided by the communication apparatus and the second communication apparatus according to a master-slave relationship between the communication apparatus and the second communication apparatus;
an analog-front-end circuit, coupled with the transmitter, for receiving and processing an analog input signal during a period, wherein the period starts while the transmitter transmits the first training sequence to the second communication apparatus and the period ends before the analog-front-end circuit receives a second training sequence;
an analog-to-digital converter (ADC), coupled with the analog-front-end circuit, for converting processed signal from the analog-front-end circuit into a digital input signal; and
a control unit, coupled with the ADC and the transmitter, for adjusting at least one resistance, at least one capacitance, or at least one resistance and at least one capacitance in an analog echo cancellation circuit according to the digital input signal before the analog-front-end circuit receives the second training sequence;

wherein the second training sequence is a very first training sequence transmitted from the second communication apparatus after the calibration order is decided.

2. The communication apparatus of claim 1, wherein the control unit is utilized for adjusting operation parameters of the analog-front-end circuit according to the second training sequence transmitted from the second communication apparatus.

3. The communication apparatus of claim 1, wherein the analog echo cancellation circuit comprises:
  a first resistor, comprising a first terminal and a second terminal, wherein the second terminal of the first resistor is coupled with a first output terminal of the transmitter;
  a second resistor, comprising a first terminal and a second terminal, wherein the second terminal of the second resistor is coupled with a second output terminal of the transmitter;
  a first capacitor, comprising a first terminal and a second terminal, wherein the first terminal of the first capacitor is coupled between the first terminal of the first resistor and a first input terminal of the analog-front-end circuit, and the second terminal of the first capacitor is coupled with a fixed-voltage terminal; and
  a second capacitor, comprising a first terminal and a second terminal, wherein the first terminal of the second capacitor is coupled between the first terminal of the second resistor and a second input terminal of the analog-front-end circuit, and the second terminal of the second capacitor is coupled with the fixed-voltage terminal;
  wherein the first capacitor and the second capacitor are not in series connection, and the control unit adjusts the resistance of at least one of the first resistor and the second resistor according to the digital input signal.

4. The communication apparatus of claim 3, wherein the control unit adjusts the capacitance of at least one of the first capacitor and the second capacitor according to the digital input signal.

5. The communication apparatus of claim 1, wherein the analog echo cancellation circuit comprises:
  a first resistor, comprising a first terminal and a second terminal, wherein the second terminal of the first resistor is coupled with a first output terminal of the transmitter;
  a second resistor, comprising a first terminal and a second terminal, wherein the second terminal of the second resistor is coupled with a second output terminal of the transmitter;
  a third capacitor, comprising a first terminal and a second terminal, wherein the first terminal of the third capacitor is coupled between the second output terminal of the transmitter and a first input terminal of the analog-front-end circuit, and the second terminal of the third capacitor is coupled with a fixed-voltage terminal; and
  a fourth capacitor, comprising a first terminal and a second terminal, wherein the first terminal of the fourth capacitor is coupled between the first output terminal of the transmitter and a second input terminal of the analog-front-end circuit, and the second terminal of the fourth capacitor is coupled with the fixed-voltage terminal;
  wherein the third capacitor and the fourth capacitor are not in series connection, and the control unit adjusts the capacitance of at least one of the third capacitor and the fourth capacitor according to the digital input signal.

6. The communication apparatus of claim 5, wherein the analog echo cancellation circuit comprises:
  a first capacitor, comprising a first terminal and a second terminal, wherein the first terminal of the first capacitor is coupled between the first terminal of the first resistor and the first input terminal of the analog-front-end circuit, and the second terminal of the first capacitor is coupled with the fixed-voltage terminal; and
  a second capacitor, comprising a first terminal and a second terminal, wherein the first terminal of the second capacitor is coupled between the first terminal of the second resistor and the second input terminal of the analog-front-end circuit, and the second terminal of the second capacitor is coupled with the fixed-voltage terminal;
  wherein the first capacitor and the second capacitor are not in series connection, and the control unit adjusts the capacitance of at least one of the first capacitor and the second capacitor according to the digital input signal.

7. The communication apparatus of claim 6, wherein the control unit adjusts the resistance of at least one of the first resistor and the second resistor according to the digital input signal.

8. The communication apparatus of claim 1, wherein the control unit adjusts at least one resistance, at least one capacitance, or at least one resistance and at least one capacitance in the analog echo cancellation circuit according to the single-to-noise ratio of the digital input signal.

9. An echo cancellation method for use in a communication apparatus, the method comprising:
  utilizing a transmitter to transmit a first training sequence to a second communication apparatus after a calibration order is decided by the communication apparatus and the second communication apparatus according to a master-slave relationship between the communication apparatus and the second communication apparatus;
  receiving and processing an analog input signal at the communication apparatus during a period, wherein the period starts while the transmitter transmits the first training sequence to the second communication apparatus and the period ends before the analog-front-end circuit receives a second training sequence;
  converting processed signal into a digital input signal; and
  adjusting at least one resistance, at least one capacitance, or at least one resistance and at least one capacitance in an analog echo cancellation circuit of the communication apparatus before receiving the second training sequence;
  wherein the second training sequence is a very first training sequence transmitted from the second communication apparatus after the calibration order is decided.

10. The method of claim 9, further comprising:
  adjusting operation parameters of an analog-front-end circuit of the communication apparatus according to the second training sequence transmitted from the second communication apparatus.

11. The method of claim 10, wherein the analog echo cancellation circuit comprises:
  a first resistor, comprising a first terminal and a second terminal, wherein the second terminal of the first resistor is coupled with a first output terminal of the transmitter;
  a second resistor, comprising a first terminal and a second terminal, wherein the second terminal of the second resistor is coupled with a second output terminal of the transmitter;
  a first capacitor, comprising a first terminal and a second terminal, wherein the first terminal of the first capacitor is coupled between the first terminal of the first resistor and a first input terminal of the analog-front-end circuit, and the second terminal of the first capacitor is coupled with a fixed-voltage terminal; and
  a second capacitor, comprising a first terminal and a second terminal, wherein the first terminal of the second capacitor is coupled between the first terminal of the second resistor and a second input terminal of the analog-front-end circuit, and the second terminal of the second capacitor is coupled with the fixed-voltage terminal;

wherein the first capacitor and the second capacitor are not in series connection;

wherein the step of adjusting at least one resistance, at least one capacitance, or at least one resistance and at least one capacitance in the analog echo cancellation circuit comprises:

adjusting the resistance of at least one of the first resistor and the second resistor according to the digital input signal.

12. The method of claim 11, wherein the step of adjusting at least one resistance, at least one capacitance, or at least one resistance and at least one capacitance in the analog echo cancellation circuit further comprises:

adjusting the capacitance of at least one of the first capacitor and the second capacitor according to the digital input signal.

13. The method of claim 10, wherein the analog echo cancellation circuit comprises:

a first resistor, comprising a first terminal and a second terminal, wherein the second terminal of the first resistor is coupled with a first output terminal of the transmitter;

a second resistor, comprising a first terminal and a second terminal, wherein the second terminal of the second resistor is coupled with a second output terminal of the transmitter;

a third capacitor, comprising a first terminal and a second terminal, wherein the first terminal of the third capacitor is coupled between the second output terminal of the transmitter and a first input terminal of the analog-front-end circuit, and the third terminal of the first capacitor is coupled with a fixed-voltage terminal; and a fourth capacitor, comprising a first terminal and a second terminal, wherein the fourth terminal of the second capacitor is coupled between the first output terminal of the transmitter and a second input terminal of the analog-front-end circuit, and the second terminal of the fourth capacitor is coupled with the fixed-voltage terminal;

wherein the third capacitor and the fourth capacitor are not in series connection;

wherein the step of adjusting at least one resistance, at least one capacitance, or at least one resistance and at least one capacitance in the analog echo cancellation circuit comprises:

adjusting the capacitance of at least one of the third capacitor and the fourth capacitor according to the digital input signal.

14. The method of claim 13, wherein the analog echo cancellation circuit comprises:

a first capacitor, comprising a first terminal and a second terminal, wherein the first terminal of the first capacitor is coupled between the first terminal of the first resistor and the first input terminal of the analog-front-end circuit, and the second terminal of the first capacitor is coupled with the fixed-voltage terminal; and a second capacitor, comprising a first terminal and a second terminal, wherein the first terminal of the second capacitor is coupled between the first terminal of the second resistor and the second input terminal of the analog-front-end circuit, and the second terminal of the second capacitor is coupled with the fixed-voltage terminal;

wherein the first capacitor and the second capacitor are not in series connection;

wherein the step of adjusting at least one resistance, at least one capacitance, or at least one resistance and at least one capacitance in the analog echo cancellation circuit further comprises:

adjusting the capacitance of at least one of the first capacitor and the second capacitor according to the digital input signal.

15. The method of claim 14, wherein the step of adjusting at least one resistance, at least one capacitance, or at least one resistance and at least one capacitance in the analog echo cancellation circuit further comprises:

adjusting the resistance of at least one of the first resistor and the second resistor according to the digital input signal.

16. The method of claim 9, wherein the step of adjusting at least one resistance, at least one capacitance, or at least one resistance and at least one capacitance in the analog echo cancellation circuit further comprises:

adjusting at least one resistance, at least one capacitance, or at least one resistance and at least one capacitance in the analog echo cancellation circuit according to the single-to- noise ratio of the digital input signal.

17. A communication apparatus comprising:

a transmitter for transmitting a first training sequence to a second communication apparatus after a calibration order is decided by the communication apparatus and the second communication apparatus according to a master-slave relationship between the communication apparatus and the second communication apparatus;

an analog-front-end circuit, coupled with the transmitter, for receiving and processing an analog input signal during a period, wherein the period starts while the transmitter transmits the first training sequence to the second communication apparatus and the period ends before the analog-front-end circuit receives a second training sequence;

an analog-to-digital converter (ADC), coupled with the analog-front-end circuit, for converting processed signal from the analog-front-end circuit into a digital input signal; and a control unit, coupled with the ADC and the transmitter, for adjusting at least one resistance, at least one capacitance, or at least one resistance and at least one capacitance in an analog echo cancellation circuit according to the digital input signal when the transmitter begins the transmission of the first training sequence;

wherein the second training sequence is a very first training sequence transmitted from the second communication apparatus after the calibration order is decided.

18. The communication apparatus of claim 17, wherein the control unit adjusts at least one resistance, at least one capacitance, or at least one resistance and at least one capacitance in the analog echo cancellation circuit according to the single-to-noise ratio of the digital input signal.

* * * * *